United States Patent
Nakatsuka

[11] Patent Number: 6,046,533
[45] Date of Patent: Apr. 4, 2000

[54] DISCHARGE CELL FOR OZONE GENERATOR

[75] Inventor: Suguru Nakatsuka, Amagasaki, Japan

[73] Assignee: Sumitomo Precision Products Co., Ltd., Japan

[21] Appl. No.: 09/064,911

[22] Filed: Apr. 23, 1998

[30] Foreign Application Priority Data

Jun. 27, 1997 [JP] Japan ............................ 9-187571

[51] Int. Cl.[7] ...................................................... H01J 1/02
[52] U.S. Cl. ........................................ 313/362.1; 313/355
[58] Field of Search ............................. 313/362.1, 631, 313/355

[56] References Cited

FOREIGN PATENT DOCUMENTS 2-271903  11/1990  Japan .
2-279505  11/1990  Japan .

*Primary Examiner*—Vip Patel
*Attorney, Agent, or Firm*—Griffin, Butler, Whisenhunt & Szipl, LLP

[57] ABSTRACT

A discharge cell for use in an ozone generator is provided which can suppress a time-related reduction in ozone concentration without adding a catalytic gas such as nitrogen gas to oxygen gas as a raw material gas. The discharge cell includes a pair of electrodes disposed in an opposed spaced relation with a discharge space therebetween, and a dielectric layer of a three-layer structure consisting of three ceramic dielectric layers successively stacked on at least one of the electrodes, wherein a first dielectric layer of the dielectric layer contacting the one electrode contains no titanium dioxide, wherein a second dielectric layer of the dielectric layer exposed to the discharge space contains titanium dioxide in a metal element ratio of not lower than 10 wt %.

30 Claims, 3 Drawing Sheets

DISCHARGE CELL FOR OZONE GENERATOR

GOVERNMENT RIGHTS

This invention was made with the United States Government support under Contract No. DE-AC04-94AL85000 awarded by the U.S. Department of Energy. The Government has certain rights in this invention.

BACKGROUND OF THE INVENTION

1. Field of the Invention

The present invention relates to a discharge cell for use in an ozone generator and, more particularly, to a discharge cell which is suitable for an ozone generator for semiconductor production.

2. Description of the Background Art

Discharge cells for use in ozone generators are generally classified into a plate type and a tube type. Such a discharge cell, whichever type it falls in, has a pair of electrodes spaced with a discharge space therebetween, and a dielectric layer provided on a surface of at least one of the electrodes. Generation of ozone gas is achieved by passing a raw material gas such as oxygen gas through the discharge space.

It is a conventional practice to employ a glass plate as the dielectric layer for the discharge cell. However, the glass plate dielectric layer generally has a great thickness because glass has a small dielectric constant. For this reason, ceramics which have greater dielectric constants than glass are often used for the dielectric layer. Glass plate dielectric layers will supposedly be superseded with dielectric layers such as of ceramic plates and sapphire plates which have greater dielectric constants and definite compositions as will be described later.

The ozone generators are used in a variety of chemical treatment plants, and introduced into semiconductor production plants. In the case of ozone generators to be employed for formation of oxide films, ashing of resists, cleaning of silicon wafers and the like in the semiconductor production, it is necessary to generate high purity ozone gas containing an extremely small amount of contaminants (metal impurities and particles). To this end, high purity oxygen gas is used as the raw material gas for the generation of ozone gas.

Where the dielectric layer of the discharge cell is formed by sintering a dielectric material such as a ceramic material on the surface of the electrode, a portion of the dielectric layer undesirably has an indefinite composition. Therefore, dielectric layers formed in such a manner are being superseded with dielectric layers such as of preformed ceramic plates and sapphire plates which are highly pure and have definite compositions. Further, a pipe formed of a stainless steel such as SUS316L is used as a pipeline for supplying the generated ozone gas to an application site.

Where high purity oxygen gas is used as the raw material gas, however, the concentration of ozone in the generated ozone gas tends to be reduced with time. This is a critical problem. An effective approach to this problem is to add a trace amount of a catalytic gas to high purity oxygen gas (Japanese Unexamined Patent Publications No. 1-282104 (1989), No. 1-298003 (1989) and No. 3-218905 (1991)).

High purity nitrogen gas is often used as the catalytic gas for prevention of the time-related reduction in the ozone concentration, because the nitrogen gas is readily available for the semiconductor production. However, it has recently been found that, where nitrogen gas is used in combination with oxygen gas, ozone gas to be supplied contains metal impurities, which adversely influence the semiconductor production. This is because, where nitrogen gas is added to high purity oxygen gas for the generation of ozone gas, the generated ozone gas contains nitrogen oxides as side products, which may deteriorate or corrode the interior surface of the stainless steel pipe. As a result, the metal impurities from the stainless steel pipe are deposited in a site to which ozone gas is supplied.

To solve this drawback, Japanese Unexamined Patent Publication No. 8-133707 (1996) proposes addition of a relatively large amount (10 to 20 vol %) of carbon dioxide and/or carbon monoxide as a catalytic gas. The use of a catalytic gas other than nitrogen gas reduces the production of the metal impurities in the site supplied with ozone gas. However, this approach requires an additional pipeline for supplying the catalytic gas to the oxygen gas pipeline, thereby complicating the system. In addition, atoms other than oxygen atoms are contained in the generated ozone gas, so that the composition of a treatment gas may vary. For example, this results in formation of Si—$CH_3$ bonds in an $SiO_2$ film. Therefore, this approach is still unsatisfactory.

SUMMARY OF THE INVENTION

It is an object of the present invention to provide a discharge cell for an ozone generator which can effectively suppress the time-related reduction in the ozone concentration without addition of any catalytic gas. To attain the object, the inventors of the present invention repeatedly performed various experiments, focusing on the compositions of dielectric materials directly related to the discharging in the discharge cell and offering a composition design flexibility. As a result, the inventors have come up with the following ideas:

(1) Even if high purity oxygen gas not containing a catalytic gas is used as a raw material gas, the time-related reduction in the ozone concentration can be suppressed where titanium dioxide ($TiO_2$) is added to a dielectric material for the dielectric layer of the ozone generator discharge cell. The reason is as follows:

Ozone molecules immediately after being generated in a discharge cell are in electron excited states. If the catalytic gas is present in the ozone gas, the catalytic gas absorbs the excitation energy of the ozone molecules, so that the ozone molecules are brought back into the ground state from the excited states without any change in their atomic structures. If the catalytic gas is absent in the ozone gas, on the other hand, the atomic structures of the ozone molecules are changed when the ozone molecules are brought back into the ground state, whereby the ozone molecules revert to oxygen molecules. This is why the addition of the catalytic gas is effective for suppression of the time-related reduction in the ozone concentration. If the dielectric material contains titanium dioxide, titanium dioxide molecules absorb the excitation energy of the ozone molecules by their photocatalytic action associated with the discharging, so that the ozone molecules are brought back into the ground state without any change in their atomic structures like in the case where the catalytic gas is present.

(2) The dielectric material is required to contain titanium dioxide in a metal element ratio of not lower than 10 wt % for the suppression of the time-related reduction in the ozone concentration.

The ozone generator discharge cell according to the present invention has been developed on the basis of the ideas described above. The discharge cell includes: a pair of electrodes disposed in an opposed spaced relation with a discharge space therebetween; and a dielectric layer of a coating formed on a surface of at least one of the electrodes, the dielectric layer containing titanium dioxide in a metal element ratio of not lower than 10 wt %.

The term "metal element ratio" is herein meant by a content ratio of a metal element which is determined by regarding a substance consisting of oxides of plural metal elements as an aggregate of the metal elements alone with an oxygen content in the metal oxides ignored.

In accordance with the present invention, the ozone generator discharge cell having the aforesaid construction with the dielectric layer thereof containing titanium dioxide in a metal element ratio of not lower than 10 wt % can effectively suppress the time-related reduction in the ozone concentration without addition of the catalytic gas. Therefore, the cost increase associated with the use of the catalytic gas and the generation of the metal impurities can be avoided. Thus, high purity ozone gas suitable for the semiconductor production can be produced economically.

Titanium dioxide has an extremely small thermal expansibility compared with an electrode material. In addition, the dielectric coating layer (e.g., baked(sintered) coating layer) is firmly combined with the electrode, and the electrode underlying the dielectric layer has a greater thickness and a greater heat capacity than the dielectric layer. Therefore, where the dielectric layer contains titanium dioxide in an amount great enough to suppress the reduction in the ozone concentration, the dielectric layer may flake off or crack due to a difference in the thermal expansibility between the dielectric layer and the electrode during the use of the discharge cell.

For prevention of the flake-off and cracking of the dielectric layer, it is effective to provide a plurality of dielectric layers of coatings successively stacked on the surface of the electrode, wherein a first dielectric layer contacting the surface of the electrode contains titanium dioxide in a metal element ratio of 0 wt % or lower than 10 wt % and a second dielectric layer exposed to the discharge space contains titanium dioxide in a metal element ratio of not lower than 10 wt %.

Besides the coating (e.g., a coating formed by sintering a dielectric material on the surface of the electrode), a plate such as a ceramic plate containing titanium dioxide in a metal element ratio of not lower than 10 wt % may be used as the dielectric layer to be provided on the electrode. Where the dielectric layer is comprised of the plate, the dielectric layer can be bonded to the electrode with an adhesive and the thickness of the electrode can be reduced with respect to the thickness of the dielectric layer. Therefore, the electrode can accommodate the difference in the thermal expansibility between the dielectric layer and the electrode, so that the cracking of the dielectric layer can be prevented.

Where the dielectric plate layer is bonded to the surface of the electrode, there is no need to pluralize the dielectric layer for prevention of the cracking of the dielectric layer, unlike the case where the dielectric coating layer is employed. A minimum requirement for the suppression of the time-related reduction in the ozone concentration is that at least the outermost dielectric layer exposed to the discharge space contains titanium dioxide in a metal element ratio of not lower than 10 wt %.

The foregoing and other objects, advantages and features of the present invention will readily be understood from the following detailed description in conjunction with the attached drawings.

DESCRIPTION OF PREFERRED EMBODIMENTS

Preferred embodiments of the present invention will be described with reference to the drawings.

First Embodiment

Figure 1:
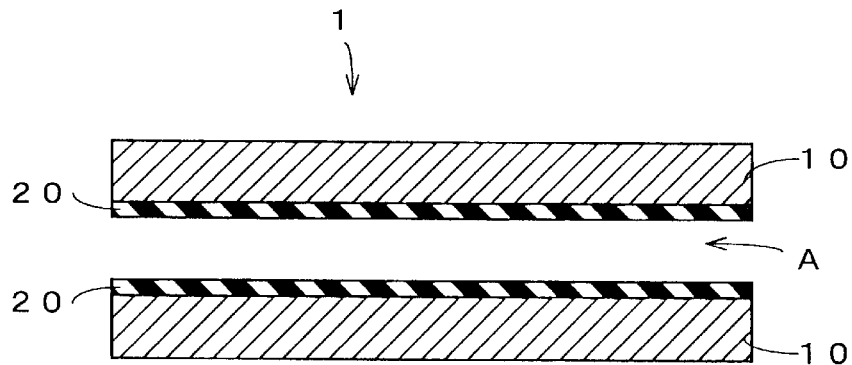
FIG. 1 is a sectional view illustrating a discharge cell for an ozone generator in accordance with a first embodiment of the present invention.

As shown in FIG. 1, a discharge cell 1 of plate type for an ozone generator has a pair of 1.0-mm thick iron electrodes 10, 10 disposed in an opposed spaced relation with a discharge space A therebetween and dielectric coating layers 20, 20 respectively formed on opposed electrode surfaces of the electrodes 10, 10. The discharge cell 1 is adapted to generate ozone gas by supplying thereto high purity oxygen gas as a raw material gas while causing non-arc discharge in the discharge space A defined between the electrodes 10, 10.

Figure 2:
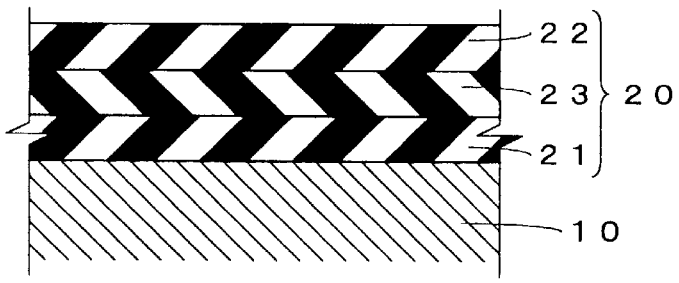
FIG. 2 is a sectional view illustrating the construction of a dielectric layer of the ozone generator discharge cell shown in FIG. 1.

The dielectric layers 20, 20 are respectively formed on the electrodes 10, 10 by sintering a ceramic material on the electrodes 10, 10. As shown in FIG. 2, the dielectric layers 20, 20 each include a first dielectric layer 21 contacting the electrode 10, a second dielectric layer 22 exposed to the discharge space A and a third dielectric layer 23 interposed between the first dielectric layer 21 and the second dielectric layer 22. The sintering for the formation of the dielectric layer 20 on the electrode 10 is achieved by spray-coating the surface of the electrode 10 with a dispersion containing a powdery ceramic material dispersed in an aqueous solution such as of NaOH, KCl or $NaAlO_2$, then drying the resulting coating, and baking the coating at a temperature of not lower than 800° C.

The second dielectric layer 22 contains titanium dioxide in a metal element ratio of not lower than 10 wt %. On the contrary, the first dielectric layer 21 contains no titanium dioxide or, if any, contains titanium dioxide in a metal element ratio of lower than 10 wt %.

The reason why the titanium dioxide content in the second dielectric layer 22 is set to not lower than 10 wt % in metal element ratio is that the dielectric layer 20 is not expected to effectively suppress the time-related reduction in the ozone concentration if the second dielectric layer 22 contains titanium dioxide in a metal element ratio of lower than 10 wt %. The titanium dioxide content is preferably as high as possible within such a range that the sintering for the formation of the second dielectric layer can be achieved without any trouble. The titanium dioxide content is preferably not lower than 20 wt %, more preferably not lower than 30 wt %, in metal element ratio.

Further, the reason why the titanium dioxide content in the first dielectric layer 21 is set to lower than 10 wt % in metal element ratio is that the dielectric layer 20 is liable to crack due to a difference in the thermal expansibility between the electrode 10 and the dielectric layer 20 if the first dielectric layer 21 contains titanium dioxide in a metal element ratio of not lower than 10 wt %. It is particularly preferred that the titanium dioxide content in the first dielectric layer 21 is not higher than 5 wt % in metal element ratio.

The third dielectric layer 23 is provided to adjust the thickness of the dielectric layer 20. The composition of the third dielectric layer 23 is not particularly limited but, in general, is the same as the composition of either the first dielectric layer 21 or the second dielectric layer 22.

The dielectric layer 20 preferably has a total thickness of 150 to 450 µm in consideration of the discharge characteristics including the withstand voltage and dielectric constant thereof. The first dielectric layer 21, the second dielectric layer 22 and the third dielectric layer 23 preferably each have a thickness of 50 to 150 μm in consideration of adhesion of these dielectric layers and ease of the sintering for the formation of the dielectric layers.

The dielectric layer 20 of the discharge cell 1 is of a three-layer structure in accordance with this embodiment, but may consist of two layers or four or more layers. In any case, the titanium dioxide content of the innermost dielectric layer contacting the electrode 10 and the titanium dioxide content of the outermost dielectric layer exposed to the discharge space A are critical.

Second Embodiment

Figure 3:
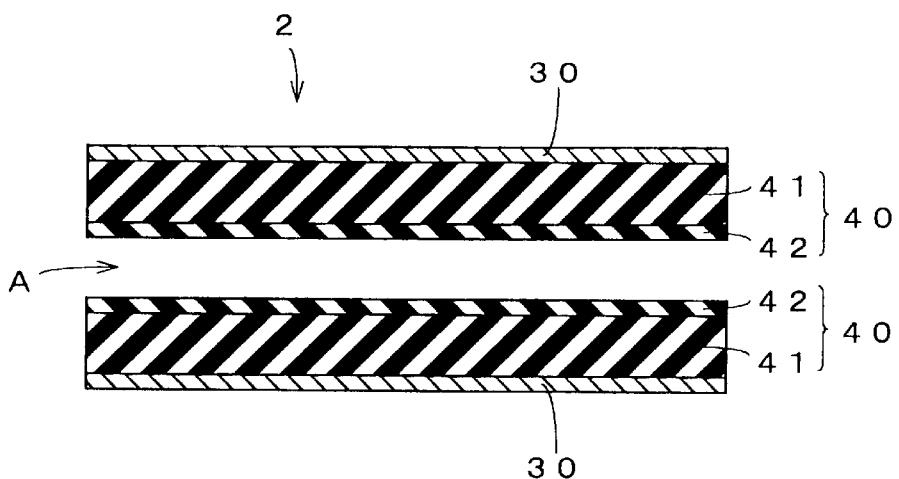
FIG. 3 is a sectional view illustrating a discharge cell for an ozone generator in accordance with a second embodiment of the present invention.

FIG. 3 shows a second embodiment of the present invention. A discharge cell 2 for an ozone generator according to this embodiment has substantially the same construction as the ozone generator discharge cell 1 described above in that dielectric layers 40, 40 are respectively provided on opposed electrode surfaces of a pair of electrodes 30, 30, but is different from the ozone generator discharge cell 1 in that the dielectric layers 40, 40 are each comprised of a preformed plate and the electrodes 30, 30 each comprised of a thin silver film having a thickness of 5 to 20 μm are respectively bonded to the back sides of the dielectric plate layers 40, 40.

The dielectric layers 40, 40 each include a first dielectric layer 41 of an $Al_2O_3$ plate or the like, and a second dielectric layer 42 formed on a surface of the first dielectric layer 41 and containing titanium dioxide in a metal element ratio of not lower than 10 wt %. The formation of the second dielectric layer 42 is achieved by sputtering, ion plating, vapor deposition or a like coating method, or ion implantation into a surface portion of the first dielectric layer 41.

The titanium dioxide content in the second dielectric layer 42 is preferably as high as possible for the suppression of the time-related reduction in the ozone concentration. Particularly, it is desirable that the second dielectric layer 42 contains titanium dioxide in a metal element ratio of 100 wt %, i.e., the second dielectric layer 42 is composed of titanium dioxide alone.

If the first dielectric layer 41 has a small thickness, it is difficult to ensure a satisfactory rigidity and strength. If the first dielectric layer 41 has a great thickness, a greater voltage drop may result. Therefore, the thickness of the first dielectric layer 41 is preferably 0.2 to 2.0 mm.

If the second dielectric layer 42 is too thin, it is difficult to completely cover the surface of the first dielectric layer 41. Accordingly, the second dielectric layer 42 preferably has a thickness of not smaller than 0.05 μm, and the upper limit of the thickness is not particularly limited. Therefore, the dielectric layer 40 may be comprised of a single plate such as a ceramic plate containing titanium dioxide in a metal element ratio of not lower than 10 wt %.

Since the electrode 30 is comprised of the thin metal film as described above, the electrode 30 can accommodate the thermal expansion of the first dielectric layer 41 of the dielectric layer 40. Therefore, there is no fear to damage the first dielectric layer 41, and exfoliation of the electrode 30 from the dielectric layer 40 can effectively be prevented.

Although the discharge cells of plate type are explained in the first embodiment and the second embodiment, the present invention can be applied to a discharge cell of tube type.

Further, the dielectric layer may be provided on the surface of one of the electrodes or on the surface of each of the electrodes. For prevention of corrosion of the electrode surfaces, it is desirable to provide the dielectric layers on the surfaces of the respective electrodes as described in the embodiments.

Where the dielectric layer is provided on the surface of one of the electrodes, the dielectric layer should of course contain titanium dioxide. On the contrary, where the dielectric layers are provided on the surfaces of the respective electrodes, at least one of the dielectric layers should contain titanium dioxide.

Examples of the coating for the dielectric layer include coatings formed by baking any of various ceramic materials, glass, quartz or the like, coatings formed by flame-spraying a ceramic material, quartz or the like, and coatings formed by applying a ceramic material, glass or the like. Examples of the plate for the dielectric layer include a ceramic plate, a sapphire plate, an alumina plate, a glass plate and a quartz plate.

The discharge cell according to the present invention is particularly suitable for an ozone generator to be used for the semiconductor production, but the application of the discharge cell is not limited thereto.

Experiment 1

Figure 4:
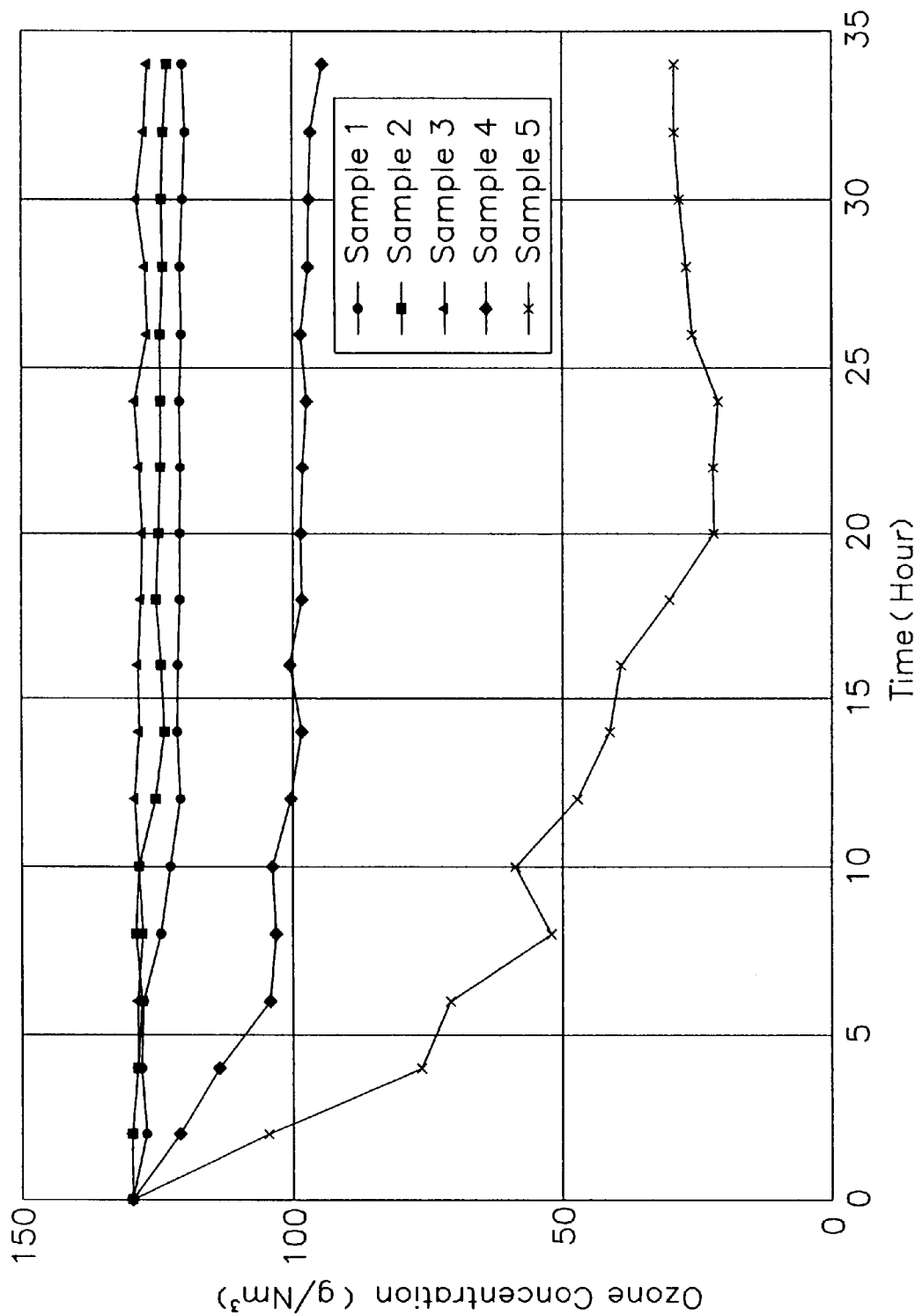
FIG. 4 is a graph showing a change in the ozone concentration in ozone gas with time where the discharge cell shown in FIG. 1 is employed.

Discharge cells (Samples 1 to 3) each including dielectric coating layers 20 as shown in FIG. 1 in accordance with the present invention were fabricated by employing dielectric layers (ceramic layers) respectively having different compositions as shown in Tables 2 to 4. Comparative discharge cells (Samples 4 to 6) as shown in FIG. 1 were fabricated by employing dielectric layers (ceramic layers) respectively having different compositions as shown in Tables 5 to 7. Ozone generators were fabricated in conformity with specifications as shown in Table 1 by employing these discharge cells. With the use of each of the ozone generators thus fabricated, ozone gas was generated by supplying high purity (99.995% pure) oxygen gas as a raw material gas to the ozone generator. A change in the ozone concentration in the generated ozone gas with time was observed. The results are shown in FIG. 4.

The dielectric layers each had a thickness of 0.1 mm. The contents of ceramic materials in the dielectric layers shown in Tables 2 to 7 were each determined by the energy dispersive X-ray diffraction (EDX) analysis, and expressed in metal element ratio. The metal elements shown in Tables 2 to 7 were regarded as existing as oxides thereof (ceramic materials) in the dielectric layers.

TABLE 1

| | |
|---|---|
| Number of discharge cells | 2 |
| Flow rate of oxygen gas | 4.0 l/min |
| Discharge power | 400 w |
| Discharge frequency | 1,200 Hz |

TABLE 2

| Sample 1 | Contents of ceramic materials [Metal element ratio (wt %)] | | | | | | | |
|---|---|---|---|---|---|---|---|---|
| | Si (SiO$_2$) | Ti (TiO$_2$) | Na (Na$_2$O) | K (K$_2$O) | B (B$_2$O$_3$) | Ca (CaO) | Al (Al$_2$O$_3$) | Mg (MgO) |
| Second dielectric layer | 50.3 | 11.2 | 10.2 | 9.7 | 18.6 | — | — | — |
| Third dielectric layer | 50.3 | 11.2 | 10.2 | 9.7 | 18.6 | — | — | — |
| First dielectric layer | 51.3 | — | 9.4 | 8.5 | 10.5 | 4.4 | 9.8 | 6.1 |

TABLE 3

| Sample 2 | Contents of ceramic materials [Metal element ratio (wt %)] | | | | | | | |
|---|---|---|---|---|---|---|---|---|
| | Si (SiO$_2$) | Ti (TiO$_2$) | Na (Na$_2$O) | K (K$_2$O) | B (B$_2$O$_3$) | Ca (CaO) | Al (Al$_2$O$_3$) | Mg (MgO) |
| Second dielectric layer | 41.6 | 27.2 | 8.8 | 6.2 | 16.2 | — | — | — |
| Third dielectric layer | 41.6 | 27.2 | 8.8 | 6.2 | 16.2 | — | — | — |
| First dielectric layer | 51.3 | — | 9.4 | 8.5 | 10.5 | 4.4 | 9.8 | 6.1 |

TABLE 4

| Sample 3 | Contents of ceramic materials [Metal element ratio (wt %)] | | | | | | | |
|---|---|---|---|---|---|---|---|---|
| | Si (SiO$_2$) | Ti (TiO$_2$) | Na (Na$_2$O) | K (K$_2$O) | B (B$_2$O$_3$) | Ca (CaO) | Al (Al$_2$O$_3$) | Mg (MgO) |
| Second dielectric layer | 38.8 | 38.2 | 4.1 | 4.3 | 14.6 | — | — | — |
| Third dielectric layer | 38.8 | 38.2 | 4.1 | 4.3 | 14.6 | — | — | — |
| First dielectric layer | 51.3 | — | 9.4 | 8.5 | 10.5 | 4.4 | 9.8 | 6.1 |

TABLE 5

| Sample 4 | Contents of ceramic materials [Metal element ratio (wt %)] | | | | | | | |
|---|---|---|---|---|---|---|---|---|
| | Si (SiO$_2$) | Ti (TiO$_2$) | Na (Na$_2$O) | K (K$_2$O) | B (B$_2$O$_3$) | Ca (CaO) | Al (Al$_2$O$_3$) | Mg (MgO) |
| Second dielectric layer | 50.9 | 9.7 | 10.4 | 9.9 | 19.1 | — | — | — |
| Third | 50.9 | 9.7 | 10.4 | 9.9 | 19.1 | — | — | — |

TABLE 5-continued

| | Contents of ceramic materials [Metal element ratio (wt %)] | | | | | | | |
|---|---|---|---|---|---|---|---|---|
| Sample 4 | Si ($SiO_2$) | Ti ($TiO_2$) | Na ($Na_2O$) | K ($K_2O$) | B ($B_2O_3$) | Ca (CaO) | Al ($Al_2O_3$) | Mg (MgO) |
| dielectric layer | | | | | | | | |
| First dielectric layer | 51.3 | — | 9.4 | 8.5 | 10.5 | 4.4 | 9.8 | 6.1 |

TABLE 6

| | Contents of ceramic materials [Metal element ratio (wt %)] | | | | | | | |
|---|---|---|---|---|---|---|---|---|
| Sample 5 | Si ($SiO_2$) | Ti ($TiO_2$) | Na ($Na_2O$) | K ($K_2O$) | B ($B_2O_3$) | Ca (CaO) | Al ($Al_2O_3$) | Mg (MgO) |
| Second dielectric layer | 62.4 | — | 13.3 | 7.5 | 16.8 | — | — | — |
| Third dielectric layer | 62.4 | — | 13.3 | 7.5 | 16.8 | — | — | — |
| First dielectric layer | 51.3 | — | 9.4 | 8.5 | 10.5 | 4.4 | 9.8 | 6.1 |

TABLE 7

| | Contents of ceramic materials [Metal element ratio (wt %)] | | | | | | | |
|---|---|---|---|---|---|---|---|---|
| Sample 6 | Si ($SiO_2$) | Ti ($TiO_2$) | Na ($Na_2O$) | K ($K_2O$) | B ($B_2O_3$) | Ca (CaO) | Al ($Al_2O_3$) | Mg (MgO) |
| Second dielectric layer | 38.8 | 38.2 | 4.1 | 4.3 | 14.6 | — | — | — |
| Third dielectric layer | 38.8 | 38.2 | 4.1 | 4.3 | 14.6 | — | — | — |
| First dielectric layer | 38.8 | 38.2 | 4.1 | 4.3 | 14.6 | — | — | — |

In this experiment, the respective ozone generators were operated for a total operation time of 35 hours.

In the discharge cells of Samples 1 to 3, the second dielectric layer 22 and the third dielectric layer 23 each contained titanium dioxide in a metal element ratio of not lower than 10 wt %, and the first dielectric layer 21 contained no titanium dioxide as shown in Tables 2 to 4. Although no catalytic gas was used in these discharge cells, almost no reduction in the ozone concentration was observed as shown in FIG. 4. FIG. 4 also indicates that the rate of the reduction in the ozone concentration decreases as the titanium dioxide content in the second dielectric layer 22 increases.

In the discharge cell of Sample 4, the second dielectric layer and the third dielectric layer each contained titanium dioxide in a metal element ratio of lower than 10 wt % (9.7 wt %), and the first dielectric layers contained no titanium dioxide as shown in Table 5. With the use of this discharge cell, as shown in FIG. 4, the ozone concentration was reduced until 10 hours after the starting of the operation of the ozone generator because of absence of a catalytic gas but, thereafter, maintained at a certain level.

In the discharge cell of Sample 5, none of the three dielectric layers contained titanium dioxide as shown in Table 6. With the use of this discharge cell, a remarkable reduction in the ozone concentration was observed as shown in FIG. 4 because a catalytic gas was not used.

In the discharge cell of Sample 6, the three dielectric layers each contained titanium dioxide in a metal element ratio of not lower than 10 wt % (38.2 wt %) as shown in Table 7. Where this discharge cell was used, a portion of the dielectric layer adjacent to a raw material gas inlet cracked.

In the discharge cells of Samples 1 to 5, the dielectric layers with their first dielectric layers 21 containing no titanium dioxide did not suffer from cracking.

Experiment 2

An experiment was carried out in substantially the same manner as in Experiment 1, except that discharge cells having dielectric plate layers as shown in FIG. 2 was used instead of the discharge cells used in Experiment 1. A change in the ozone concentration in the generated ozone gas with time was observed. The results are shown in FIG. 5.

In this experiment, a discharge cell (Sample 7) having a first dielectric layer of a 0.6-mm thick $Al_2O_3$ plate and a second dielectric layer formed on a surface of the first dielectric layer by sputtering thereon titanium dioxide to a thickness of 0.15 μm, and a comparative discharge cell (Sample 8) having a first dielectric layer of a 0.6-mm thick $Al_2O_3$ plate not covered with titanium dioxide were used.

Figure 5:
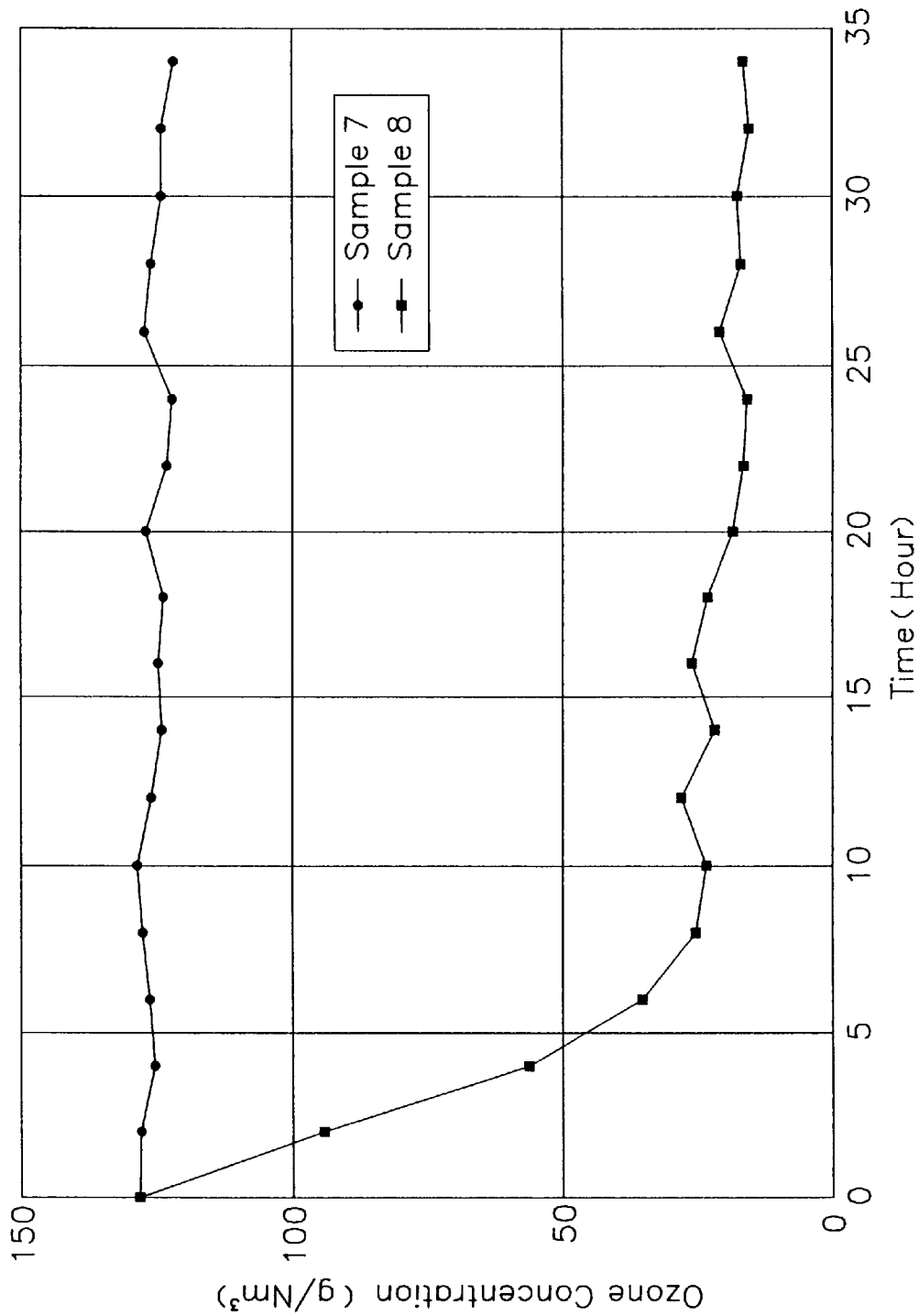
FIG. 5 is a graph showing a change in the ozone concentration in ozone gas with time where the discharge cell shown in FIG. 3 is employed.

In the case of the discharge cell of Sample 8 having the $Al_2O_3$ plate not covered with titanium dioxide, a remarkable reduction in the ozone concentration was observed as shown in FIG. 5. In the case of the discharge cell of Sample 7 having the $Al_2O_3$ plate covered with titanium dioxide, on the contrary, no reduction in the ozone concentration was observed.

What is claimed is:

1. A discharge cell for use in an ozone generator, the discharge cell comprising:
   a pair of electrodes disposed in an opposed spaced relation with a discharge space therebetween; and
   a dielectric coating layer provided on a surface of at least one of the electrodes;
   wherein the dielectric coating layer contains titanium dioxide in a metal element ratio of not lower than 10 wt %.

2. A discharge cell for use in an ozone generator, the discharge cell comprising:
   a pair of electrodes disposed in an opposed spaced relation with a discharge space therebetween; and
   a pair of dielectric coating layers respectively provided on surfaces of the pair of electrodes;
   wherein either one of the dielectric coating layers contains titanium dioxide in a metal element ratio of not lower than 10 wt %.

3. A discharge cell for use in an ozone generator, the discharge cell comprising:
   a pair of electrodes disposed in an opposed spaced relation with a discharge space therebetween; and
   a plurality of dielectric coating layers successively stacked on a surface of at least one of the electrodes;
   wherein the plurality of dielectric coating layers include a first dielectric layer contacting the one electrode and a second dielectric layer exposed to the discharge space, the first dielectric layer containing titanium dioxide in a metal element ratio of 0 wt % or lower than 10 wt %, the second dielectric layer containing titanium dioxide in a metal element ratio of not lower than 10 wt %.

4. A discharge cell for use in an ozone generator, the discharge cell comprising:
   a pair of electrodes disposed in an opposed spaced relation with a discharge space therebetween; and
   a plurality of dielectric coating layers successively stacked on a surface of each of the electrodes;
   wherein the plurality of dielectric coating layers stacked on either one of the electrodes include a first dielectric layer contacting the one electrode and a second dielectric layer exposed to the discharge space, the first dielectric layer containing titanium dioxide in a metal element ratio of 0 wt % or lower than 10 wt %, the second dielectric layer containing titanium dioxide in a metal element ratio of not lower than 10 wt %.

5. A discharge cell as set forth in claim 3, wherein the second dielectric layer contains titanium dioxide in a metal element ratio of not lower than 20 wt %.

6. A discharge cell as set forth in claim 4, wherein the second dielectric layer contains titanium dioxide in a metal element ratio of not lower than 20 wt %.

7. A discharge cell as set forth in claim 3, wherein the second dielectric layer contains titanium dioxide in a metal element ratio of not lower than 30 wt %.

8. A discharge cell as set forth in claim 4, wherein the second dielectric layer contains titanium dioxide in a metal element ratio of not lower than 30 wt %.

9. A discharge cell as set forth in claim 5, wherein the first dielectric layer contains titanium dioxide in a metal element ratio of 0 wt % or not higher than 5 wt %.

10. A discharge cell as set forth in claim 7, wherein the first dielectric layer contains titanium dioxide in a metal element ratio of 0 wt % or not higher than 5 wt %.

11. A discharge cell as set forth in claim 9, wherein the plurality of dielectric coating layers have a total thickness of 150 to 450 μm.

12. A discharge cell as set forth in claim 10, wherein the plurality of dielectric coating layers have a total thickness of 150 to 450 μm.

13. A discharge cell as set forth in claim 11, wherein the plurality of dielectric coating layers each have a thickness of 50 to 150 μm.

14. A discharge cell as set forth in claim 12, wherein the plurality of dielectric coating layers each have a thickness of 50 to 150 μm.

15. A discharge cell for use in an ozone generator, the discharge cell comprising:
    a pair of electrodes disposed in an opposed spaced relation with a discharge space therebetween; and
    a dielectric plate layer provided on a surface of at least one of the electrodes;
    wherein at least a surface portion of the dielectric plate layer exposed to the discharge space contains titanium dioxide in a metal element ratio of not lower than 10 wt %.

16. A discharge cell for use in an ozone generator, the discharge cell comprising:
    a pair of electrodes disposed in an opposed spaced relation with a discharge space therebetween; and
    a pair of dielectric plate layers respectively provided on surfaces of the pair of electrodes;
    wherein at least a surface portion of either one of the dielectric plate layers exposed to the discharge space contains titanium dioxide in a metal element ratio of not lower than 10 wt %.

17. A discharge cell for use in an ozone generator, the discharge cell comprising:
    a pair of electrodes disposed in an opposed spaced relation with a discharge space therebetween; and
    a plurality of dielectric layers successively stacked on a surface of at least one of the electrodes;
    wherein the plurality of dielectric layers include a first dielectric plate layer contacting the one electrode and a second dielectric layer exposed to the discharge space, the second dielectric layer containing titanium dioxide in a metal element ratio of not lower than 10 wt %.

18. A discharge cell for use in an ozone generator, the discharge cell comprising:
    a pair of electrodes disposed in an opposed spaced relation with a discharge space therebetween;
    a pair of first dielectric plate layers respectively provided on surfaces of the pair of electrodes; and
    a second dielectric layer provided on a surface of either one of the first dielectric plate layers and exposed to the discharge space;

wherein the second dielectric layer contains titanium dioxide in a metal element ratio of not lower than 10 wt %.

19. A discharge cell as set forth in claim 15, wherein the electrodes are each comprised of a thin metal film.

20. A discharge cell as set forth in claim 16, wherein the electrodes are each comprised of a thin metal film.

21. A discharge cell as set forth in claim 17, wherein the electrodes are each comprised of a thin metal film.

22. A discharge cell as set forth in claim 18, wherein the electrodes are each comprised of a thin metal film.

23. A discharge cell as set forth in claim 19, wherein the dielectric plate layer is composed of titanium dioxide alone.

24. A discharge cell as set forth in claim 20, wherein the dielectric plate layer is composed of titanium dioxide alone.

25. A discharge cell as set forth in claim 21, wherein the second dielectric layer is composed of titanium dioxide alone.

26. A discharge cell as set forth in claim 22, wherein the second dielectric layer is composed of titanium dioxide alone.

27. A discharge cell as set forth in claim 25, wherein the second dielectric layer has a thickness of not smaller than 0.05 $\mu$m.

28. A discharge cell as set forth in claim 26, wherein the second dielectric layer has a thickness of not smaller than 0.05 $\mu$m.

29. A discharge cell as set forth in claim 27, wherein a total thickness of the plurality of dielectric layers is 0.2 to 2.0 mm.

30. A discharge cell as set forth in claim 28, wherein a total thickness of the first dielectric plate layer and the second dielectric layer is 0.2 to 2.0 mm.

* * * * *